(12) United States Patent
Kamatani et al.

(10) Patent No.: US 8,941,773 B2
(45) Date of Patent: Jan. 27, 2015

(54) LENS MODULE, IMAGE CAPTURING DEVICE, AND ELECTRONIC APPARATUS

(75) Inventors: Yoshiteru Kamatani, Kanagawa (JP); Yoshihito Higashitsutsumi, Kanagawa (JP); Yoichiro Fujinaga, Kanagawa (JP); Junichi Muramoto, Tokyo (JP); Shuji Shimizu, Kanagawa (JP)

(73) Assignee: Sony Corporation (JP)

( * ) Notice: Subject to any disclaimer, the term of this patent is extended or adjusted under 35 U.S.C. 154(b) by 247 days.

(21) Appl. No.: 13/419,738

(22) Filed: Mar. 14, 2012

(65) Prior Publication Data

US 2012/0249868 A1    Oct. 4, 2012

(30) Foreign Application Priority Data

Mar. 29, 2011 (JP) ................................. 2011-072176

(51) Int. Cl.
| | |
|---|---|
| *H04N 5/232* | (2006.01) |
| *H04N 5/225* | (2006.01) |
| *H04N 5/228* | (2006.01) |
| *G02B 7/08* | (2006.01) |

(52) U.S. Cl.
CPC ............... *H04N 5/2254* (2013.01); *G02B 7/08* (2013.01); *G03B 2205/0061* (2013.01); *G03B 2205/0092* (2013.01)
USPC ....... 348/345; 348/373; 348/375; 348/208.11

(58) Field of Classification Search
CPC .................................................... H04N 5/2252
USPC ...................................... 348/373, 345, 208.11
See application file for complete search history.

(56) References Cited

U.S. PATENT DOCUMENTS

| | | | | |
|---|---|---|---|---|
| 7,800,847 | B2 * | 9/2010 | Nagai et al. .................... | 359/813 |
| 8,295,696 | B2 * | 10/2012 | Murakami et al. ............. | 396/133 |
| 2009/0091829 | A1 * | 4/2009 | Nagai et al. .................... | 359/557 |
| 2009/0091832 | A1 * | 4/2009 | Nagai et al. .................... | 359/557 |
| 2010/0060778 | A1 * | 3/2010 | Tsuchiya et al. .............. | 348/340 |
| 2010/0110571 | A1 * | 5/2010 | Ono et al. ...................... | 359/824 |

FOREIGN PATENT DOCUMENTS

| | | |
|---|---|---|
| JP | 2006-172635 | 6/2006 |
| JP | 2006-293006 | 10/2006 |

* cited by examiner

*Primary Examiner* — Nhan T Tran
*Assistant Examiner* — Chan Nguyen
(74) *Attorney, Agent, or Firm* — Sheridan Ross P.C.

(57) ABSTRACT

A lens module includes a lens body; a lens holding member that movably holds the lens body along an optical axis of the lens body without tilting the optical axis; a displacement element that has a flat-plate shape of which one end edge on a side of the lens body along the optical axis is disposed as a free end and the free end is displaced to freely approach the lens body by applying a voltage; and a push-up member that is disposed on the free end of the displacement element and is inserted on one end surface side of the lens body, which is perpendicular to the optical axis, by the approach towards the lens body of the displacement element so as to push up the lens body in the optical axis direction.

14 Claims, 12 Drawing Sheets

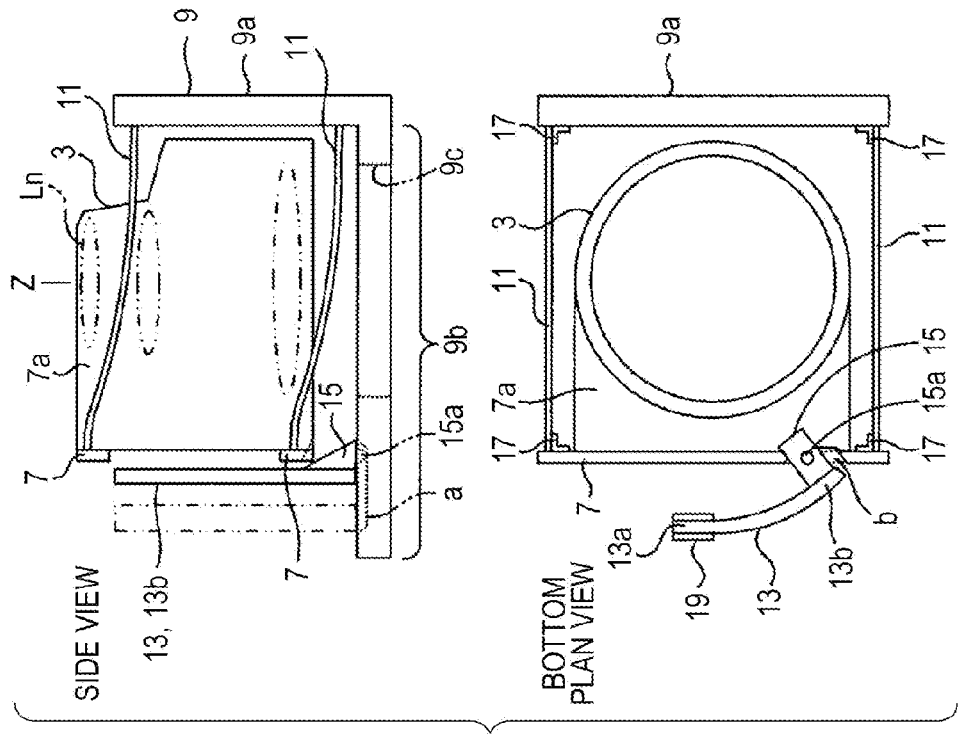
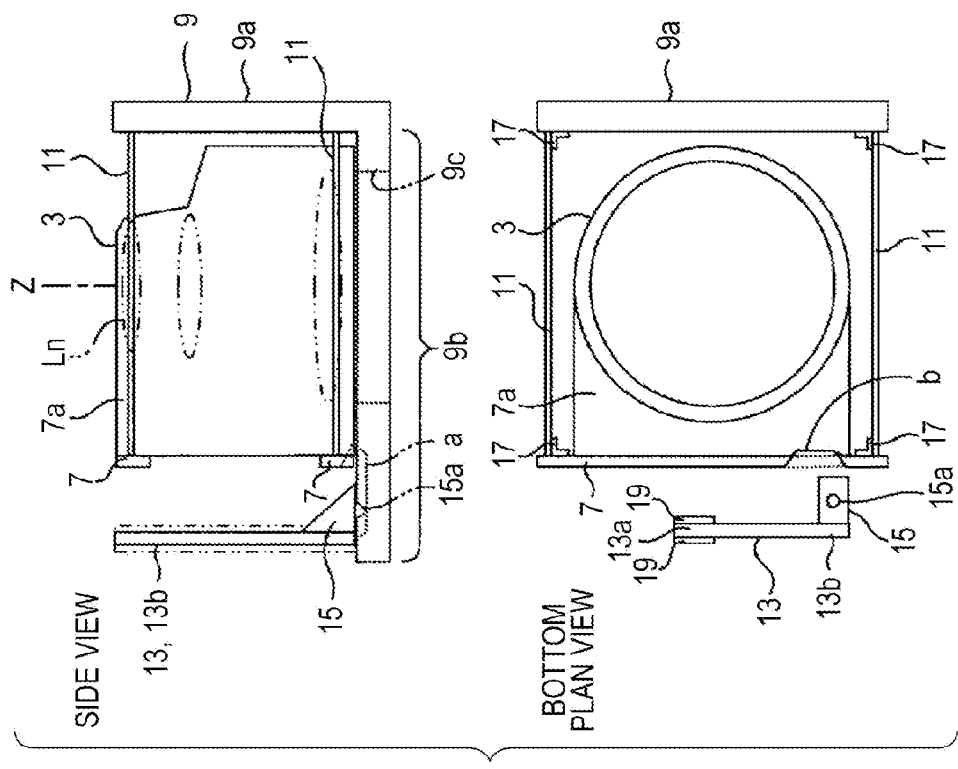

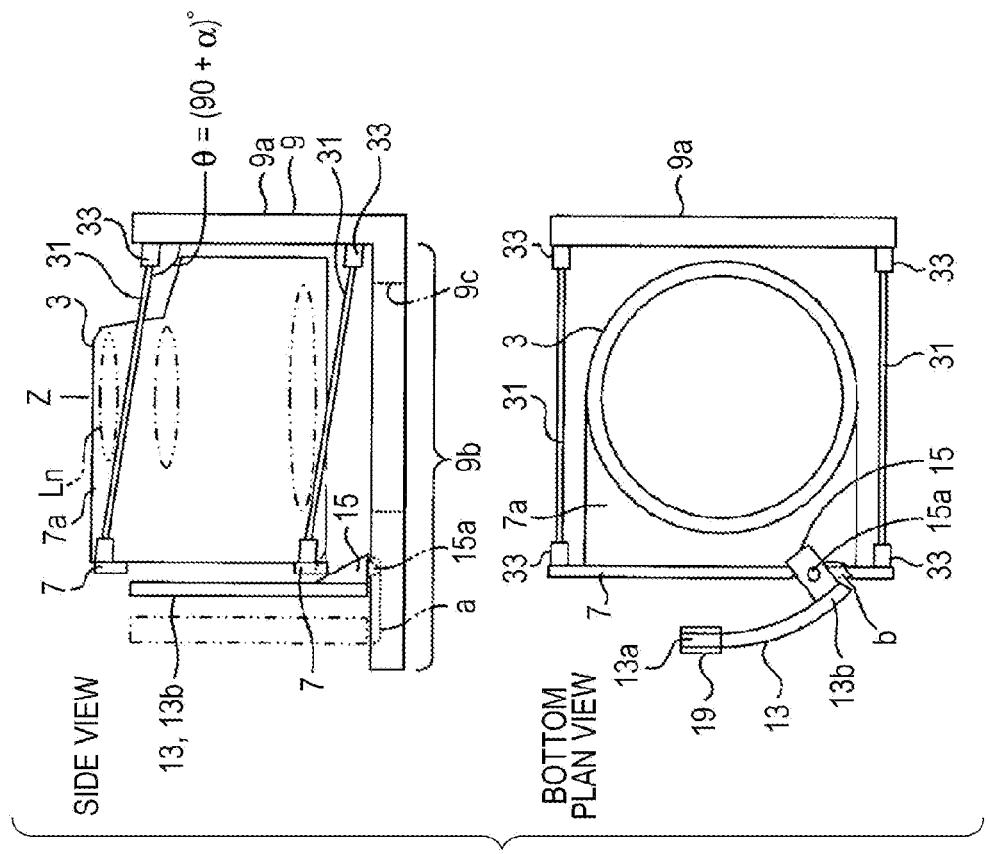
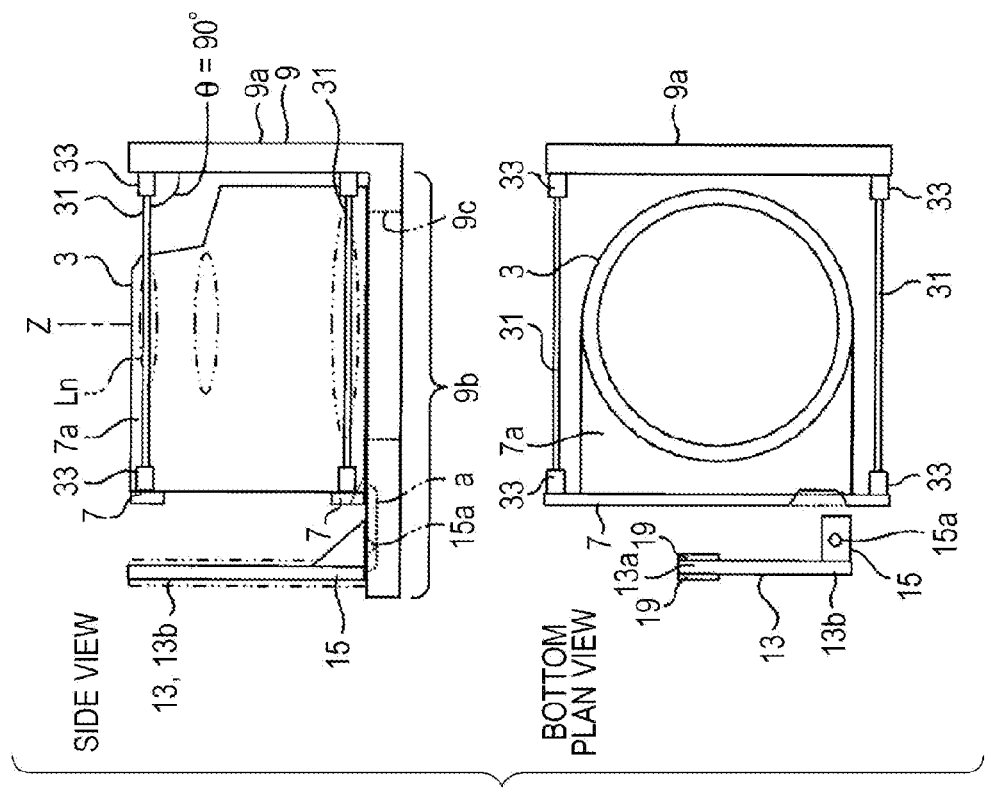

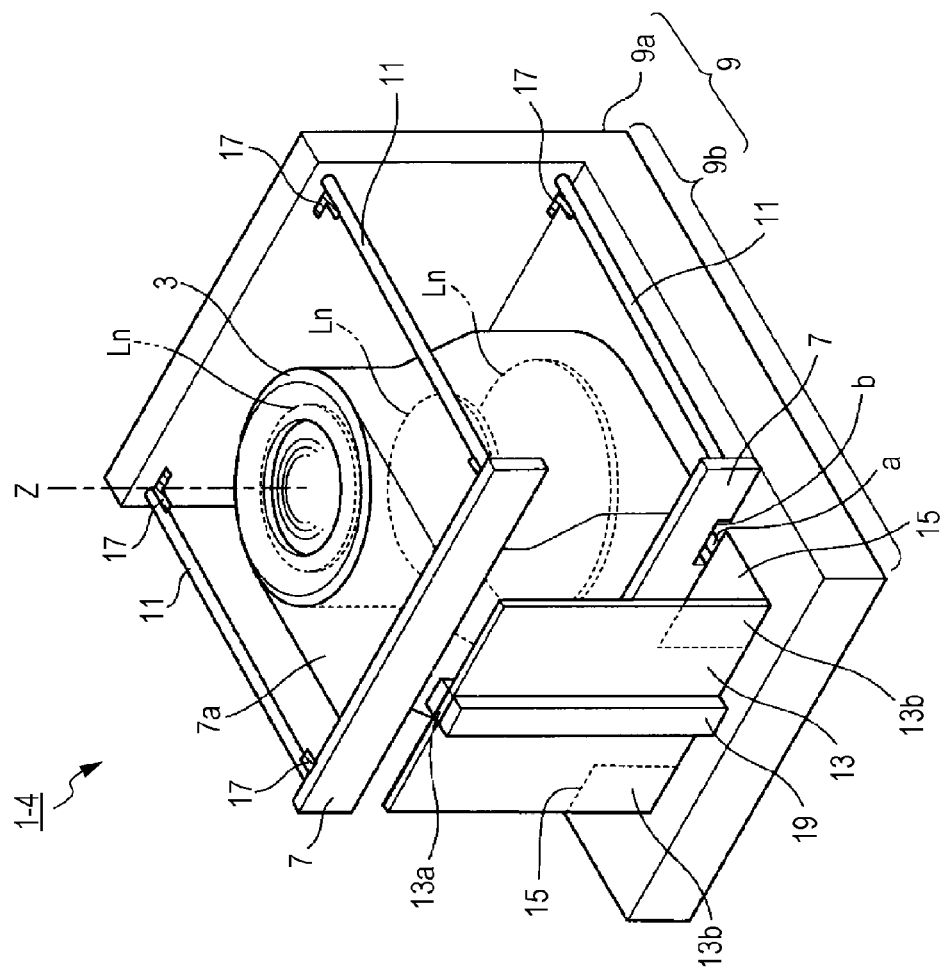

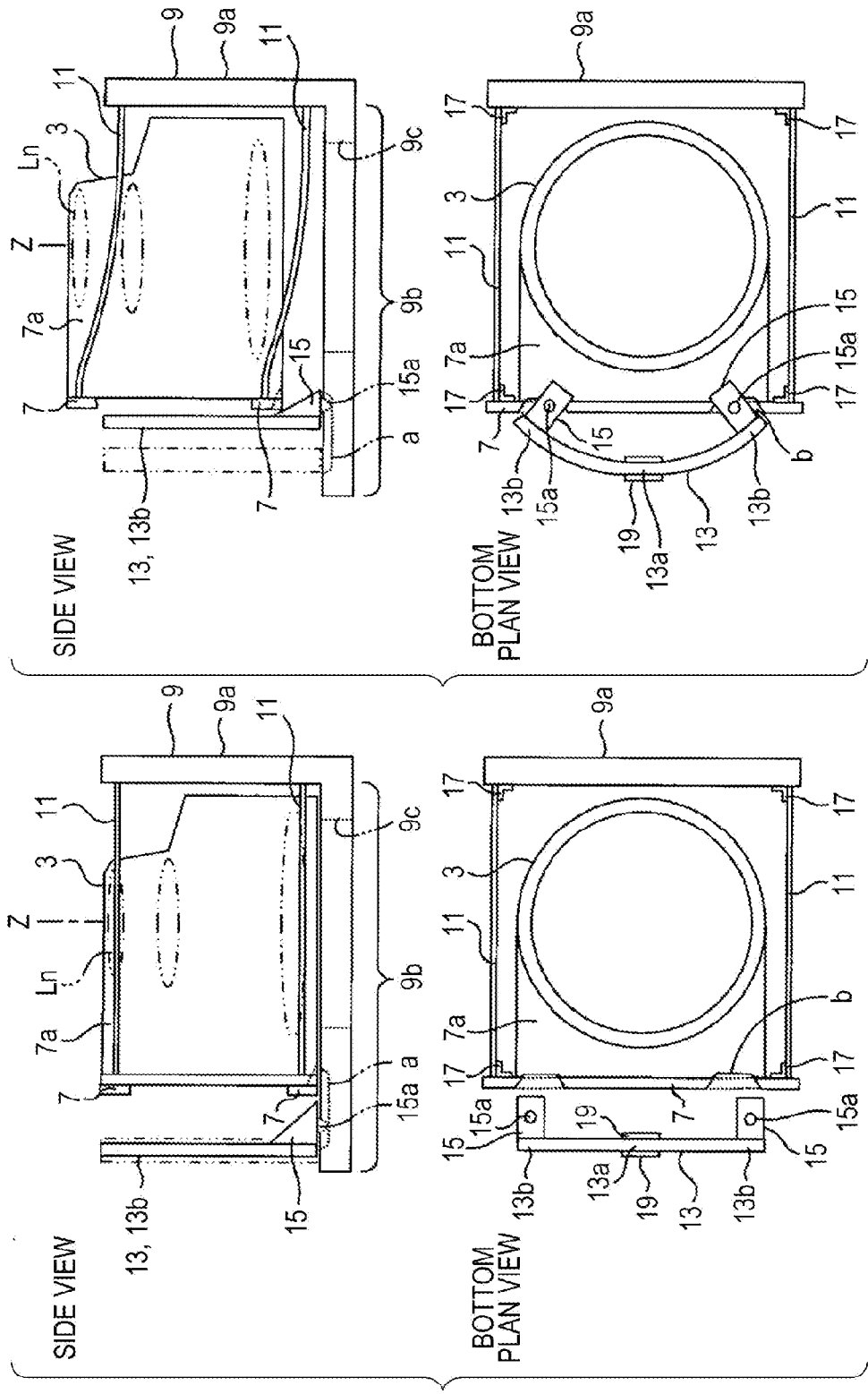

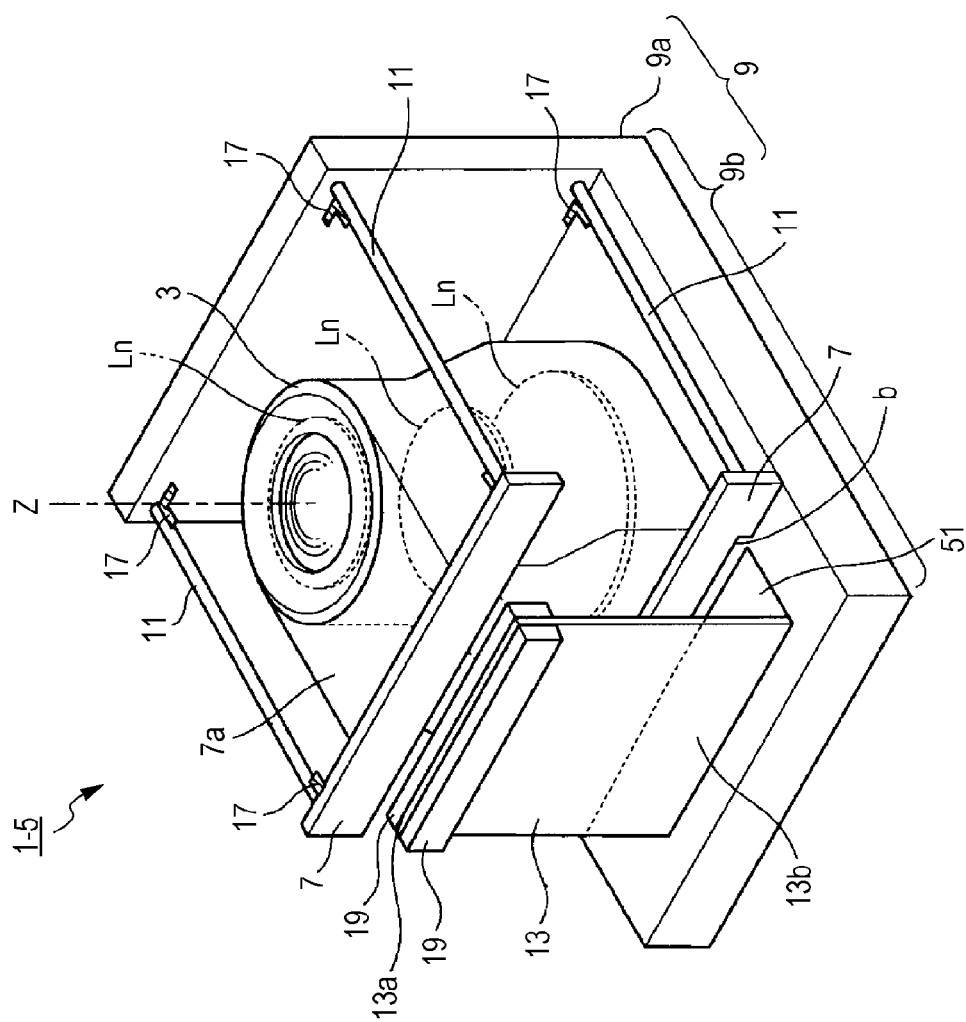

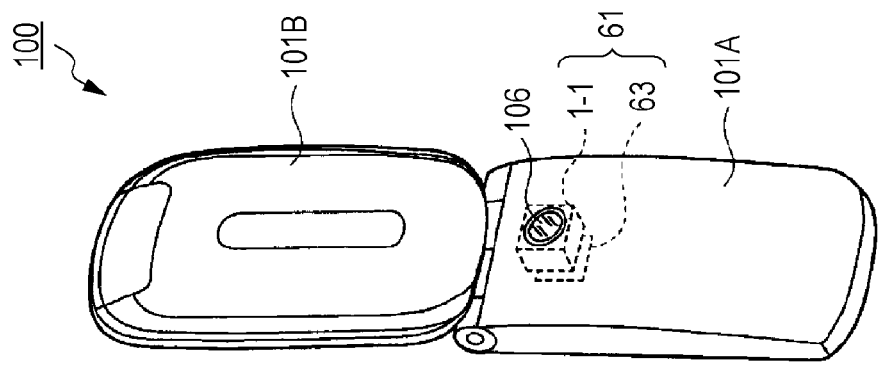
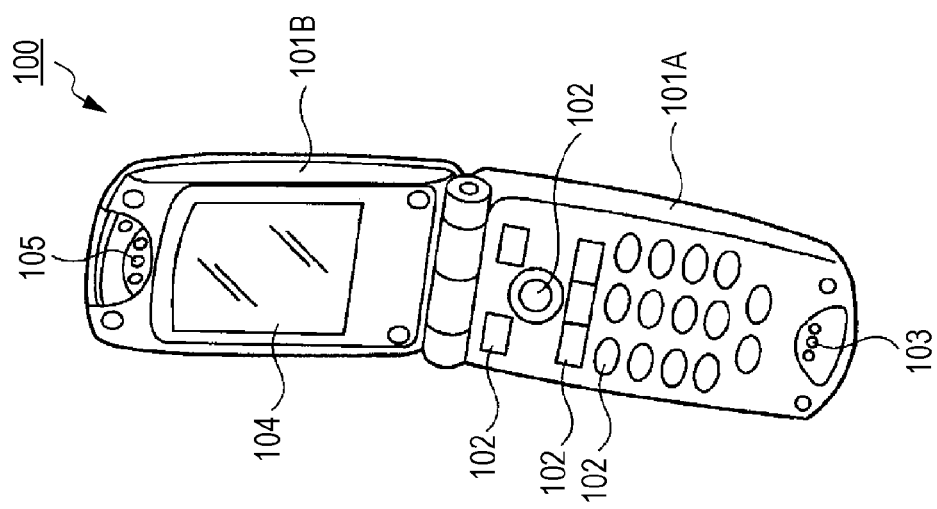

LENS MODULE, IMAGE CAPTURING DEVICE, AND ELECTRONIC APPARATUS

BACKGROUND

The present technology relates to a lens module, an image capturing device, and an electronic apparatus. In particular, the present technology relates to a lens module, which drives a lens by using a displacement element having a flat-plate shape changed by application of a voltage, and an image capturing device and an electronic apparatus using the lens module.

In recent years, as functions of portable electronic apparatuses such as mobile phones, personal computers (PC), or PDAs (Personal Digital Assistant) have remarkably increased, apparatuses, each of which is equipped with a lens module so as to thereby have an image capturing function, have become popular. In such a portable electronic apparatus, in order to realize autofocus of a camera module, it is necessary to reciprocate a lens in a subject direction along the optical axis.

In the past, there was a general method of shifting the lens in the lens module through a driving section such as a voice coil motor or a stepping motor. However, recently, in terms of compactness, apparatuses using a polymer actuator element as a driving section have been developed. The polymer actuator element is configured such that an ion-exchange resin film is interposed between, for example, a pair of electrodes. With such a configuration, an electric potential difference is caused between the pair of electrodes, and thus the ion-exchange resin film is displaced in a direction orthogonal to the film surface.

As the lens module using such a polymer actuator element, for example, there is a lens module having a configuration in which a guiding shaft is provided that supports a movable mirror frame holding a lens group so as to move it along the optical axis and the polymer actuator element is disposed at a position where the element overlaps with the movable mirror frame in the optical axis direction. With such a configuration, the movable mirror frame is moved by the deformation of the polymer actuator element in the optical axis direction (for example, refer to Japanese Unexamined Patent Application Publication No. 2006-293006).

Further, as another configuration, there is a lens module having a configuration in which one set of polymer actuator elements of which the bending directions are different from each other are combined and a lens is mounted on one end portion of the polymer actuator element (for example, refer to Japanese Unexamined Patent Application Publication No. 2006-172635).

SUMMARY

However, the lens module disclosed in Japanese Unexamined Patent Application Publication No. 2006-293006, the polymer actuator element is disposed at a position where the element overlaps with the movable mirror frame holding the lens group in the optical axis direction. Hence, this inhibits a decrease in thickness of the lens module and the electronic apparatus using the lens module.

Further, the lens module disclosed in Japanese Unexamined Patent Application Publication No. 2006-172635, the lens is mounted on the end portion of the polymer actuator element, and thus in order to increase a movable range of the lens, a certain length is necessary for the polymer actuator element. This is a factor that inhibits a decrease in size of the lens module and the electronic apparatus using the lens module.

According to the present technology, in the configuration in which the displacement element having a flat-plate shape is used to drive a lens, by providing a lens module capable of achieving a decrease in size and a decrease in thickness thereof, it is desirable to decrease the sizes and thicknesses of an image capturing device and an electronic apparatus using the lens module.

According to an embodiment of the present technology, there is provided a lens module including: a lens body; a lens holding member that movably holds the lens body along an optical axis of the lens body without tilting the optical axis; a displacement element that has a flat-plate shape of which one end edge on a side of the lens body along the optical axis is disposed as a free end and the free end is displaced to freely approach the lens body by applying a voltage; and a push-up member that is disposed on the free end of the displacement element and is inserted on one end surface side of the lens body, which is perpendicular to the optical axis, by the approach towards the lens body of the displacement element so as to push up the lens body in the optical axis direction.

In the lens module having such a configuration, it is possible to push up the lens body by inserting the push-up member, which is provided on the free end by the displacement of the free end of the displacement element, on one end surface side of the lens body. At this time, the lens body, which is held by the lens holding member, is shifted along the optical axis without tilting the optical axis. Thereby, the lens body, which is not tilted in the optical axis direction, is shifted by the displacement of the displacement element which is disposed along the optical axis in the direction lateral to the lens body. Accordingly, as compared with a configuration in which the displacement element overlaps with the optical axis direction of the lens body or the lens body is held on the end portion of the displacement element, it is possible to decrease the size and thickness of the lens module.

Further, according to another embodiment of the present technology, there are also provided an image capturing device and an electronic apparatus using such a lens module.

As described above, according to the embodiments of the present technology, it is possible to shift the lens body in the optical axis direction without tilting by the displacement of the displacement element which is disposed along the optical axis in the direction lateral to the lens body. Hence, it is possible to decrease sizes and thicknesses of an image capturing device and an electronic apparatus using the lens module.

BRIEF DESCRIPTION OF THE DRAWINGS

FIGS. 2A and 2B are side views and bottom plan views illustrating a configuration and driving of the lens module according to the first embodiment;

FIGS. 6A and 6B are side views and bottom plan views illustrating a configuration and driving of the lens module according to the third embodiment;

FIG. 7 is a perspective view illustrating a configuration of a lens module according to a fourth embodiment;

FIGS. 8A and 8B are side views and bottom plan views illustrating a configuration and driving of the lens module according to the fourth embodiment;

FIG. 9 is a perspective view illustrating a configuration of a lens module according to a fifth embodiment;

FIGS. 12A and 12B are configuration diagrams illustrating an electronic apparatus according to a seventh embodiment.

DETAILED DESCRIPTION OF EMBODIMENTS

Hereinafter, the embodiments of the present technology will be described with reference to the accompanying drawings in order of the following items.

1. First Embodiment (Lens Module)
2. Second Embodiment (Lens Module Using Flat Plate in Supporting Body)
3. Third Embodiment (Lens Module Using Link Bar in Supporting Body)
4. Fourth Embodiment (Lens Module in Which Both Ends Of Displacement Element Are Formed as Free Ends)
5. Fifth Embodiment (Lens Module in Which Lower End Of Displacement Element Is Formed as Free End)
6. Sixth Embodiment (Image Capturing Device)
7. Seventh Embodiment (Electronic Apparatus)

1. First Embodiment

Lens Module

Figure 1:
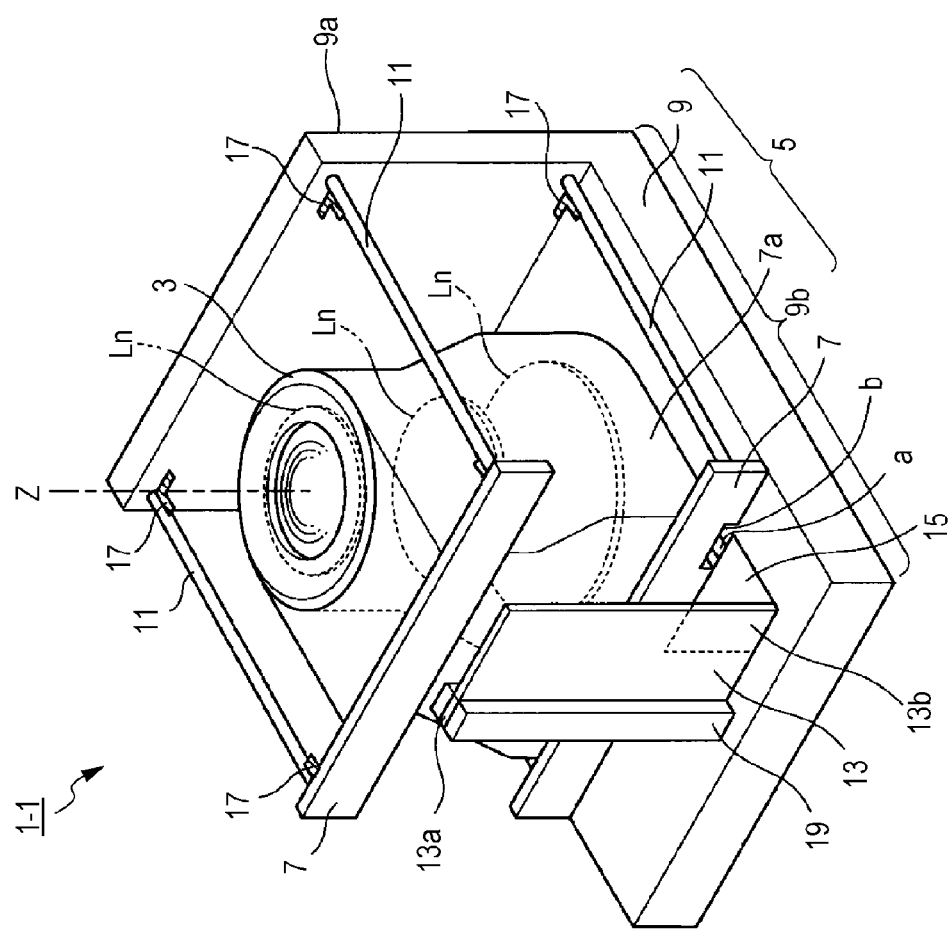
FIG. 1 is a perspective view illustrating a configuration of a lens module according to a first embodiment.

FIG. 1 is a perspective view illustrating a configuration of a lens module according to a first embodiment. FIGS. 2A and 2B are side views and bottom plan views illustrating a configuration and driving of the lens module according to the first embodiment. Hereinbelow, referring to the drawings, a description will be given of the configuration of the lens module and the driving of the lens module according to the first embodiment.

Configuration of Lens Module of First Embodiment

The lens module 1-1 shown in FIGS. 1, 2A, and 2B is provided in, for example, an image capturing device or an optical pickup apparatus, and is for moving a lens Ln along an optical axis z without tilting the optical axis z. The lens module 1-1 includes: a lens body 3 that includes the lens Ln; and a lens holding member 5 that movably holds the lens body 3. The lens holding member 5 includes a holder body 7, a fixing body 9, and a supporting body 11. Further, the lens module 1-1 includes: a displacement element 13 that serves as a driving source for moving the lens body 3 and has a flat-plate shape; and a push-up member 15 that is provided on a free end 13b of the displacement element 13. Next, details of the respective components will be sequentially described.

Lens Body 3

The lens body 3 has a configuration using an objective lens of the image capturing device or the optical pickup apparatus. The lens body 3 may be integrated as a barrel shape by combining a plurality of lenses Ln in the direction of the optical axis z, or may be formed by a single lens Ln. When the lens body 3 has the barrel shape, the barrel shape may be a cylindrical shape or a rectangular parallelepiped shape. Further, the diameter of the lens body 3 may be changed in the direction of the optical axis z according to the diameter of the respective lenses Ln which are arranged in the direction of the optical axis z. In the configuration of the example shown in the drawing, the plurality of lenses Ln are arranged in order of the magnitudes of the diameters thereof along the optical axis z, and thereby the diameter of the lens body 3 having a cylindrical barrel shape increases along the optical axis z.

Lens Holding Member 5

The lens holding member 5 is to movably hold the lens body 3 along the optical axis z without tilting the optical axis z of the lens body 3. The lens holding member 5 includes, for example as described below: a holder body 7 that holds the lens body 3; a fixing body 9 that is opposed to the holder bodies 7; and a plurality of supporting bodies 11 that is suspended between the holder bodies 7 and the fixing body 9.

Holder Body 7

The holder bodies 7 are to hold the lens body 3 on the side wall along the optical axis z, and are arranged along the optical axis z of the lens body 3. Here, for example, two holder bodies 7, each of which has a flat-plate shape and extends in a direction perpendicular to the optical axis z of the lens body 3, are arranged in parallel with the extending direction of the optical axis z. The lens body 3 is fixed by interposing a lens holder 7a having an arm shape between the lens body 3 and the holder body 7. Accordingly, the lens holder 7a constitutes a part of the holder body 7. In addition, the holder body 7 is not limited to such a flat-plate shape, and may have a wire shape with a rigidity capable of stably holding the lens body 3. In this case, the holder body 7 may be integrated with the supporting bodies 11 to be described below.

Fixing Body 9

The fixing body 9 is a member for fixing the lens module 1-1 in a casing of the image capturing device or the optical pickup apparatus. The fixing body 9 has a wall section 9a which is opposed to the holder body 7 in a state where the lens body 3 is interposed between the fixing body 9 and the holder body 7. The width of the wall section 9a in a direction perpendicular to the optical axis z is set to be approximately equal to or greater than that of the holder body 7.

Further, the fixing body 9 has a mount 9b which extends from one end side of the wall section 9a in a direction perpendicular to the optical axis z of the lens body 3. The mount 9b is disposed to overlap with the lens body 3. In addition, for convenience of description, the mount 9b is not shown in the bottom plan view of FIGS. 2A and 2B.

The mount 9b is provided with an opening 9c (refer to the side views) which passes light concentrated by the lens body 3. In the mount 9b, a track a, into which the push-up member 15 is fit, is provided on the upper surface on the side where the lens body 3 is disposed, that is, the surface where the push-up member 15 to be described later is placed. The track a is disposed along the path of the movement of the push-up member 15 based on the displacement of the free end 13b of the displacement element 13, and is formed in, for example, a groove shape shown in the drawing, or a protruded line shape (a rail shape).

Supporting Body 11

The plurality of supporting bodies 11 is suspended between the holder bodies 7 and the wall section 9a of the fixing body 9 at a position at which the lens body 3 is interposed therebetween, and supports the holder bodies 7 and the lens body 3 held by them so as to cause them to be movable along the optical axis z. Each supporting body 11 is made of a material having a certain degree of rigidity and having flexibility. As such a material, an elastic wire is used. The elastic wire is a material having restorative force that restores the bent state thereof to a linear shape.

Two supporting bodies 11 mentioned above are disposed at each position where the lens body 3 is interposed from the direction of the side wall, that is, a total of four supporting bodies 11 are disposed. The two supporting bodies 11 and 11, which are disposed on one side of the lens body 3, are disposed at positions with different heights along the optical axis z. Further, the two supporting bodies 11 and 11, which are disposed on the other side of the lens body 3, are disposed at positions with different heights along the optical axis z. Here, the pair of supporting bodies 11 and 11 disposed with the lens body 3 interposed therebetween is disposed, for example, at the same height relative to the optical axis z.

Each supporting body 11 has the same length and equivalent restorative force. Thereby, in an initial state where force is not applied to the lens body 3, as shown in the side view of FIG. 2A, the supporting bodies 11 are held at 90° with respect to the holder bodies 7 and the wall section 9a of the fixing body 9, and the supporting bodies 11 are held at 90° with respect to the optical axis z of the lens body 3. Further, even in the case where force is applied to the holder bodies 7 and the lens body 3, each supporting body 11 tends to be restored to the initial state.

Further, twist-proof bodies 17 are provided at the connecting portions between the respective supporting bodies 11 and the wall section 9a of the fixing body 9 and the connecting portions between the supporting bodies 11 and the holder bodies 7 such that the supporting bodies 11 are curved only toward the inner surface parallel with the optical axis z. As the twist-proof body 17, for example, an L-shaped elastic hinge is used.

Displacement Element 13

The displacement element 13 is an element of which the shape is changed by applying a voltage. Here, the element is assumed as a flat-plate-shaped element which is bendable by applying a voltage. The displacement element 13 is disposed to be lateral to the lens body 3 along the optical axis z on the holder body 7 side, and the one end edge thereof parallel with the optical axis z is fixed onto the mount 9b of the fixing body 9 by the fixing portion 13a. The fixing portion 13a interconnects the electrode terminals 19 throughout the entire length thereof. On the other hand, the other end edge opposed to the fixing portion 13a is formed as the free end 13b. Thereby, when the displacement element 13 is deformed by applying a voltage from the electrode terminal 19 to the fixing portion 13a of the displacement element 13, the free end 13b of the displacement element 13 can be displaced to freely approach the lens body 3.

Figure 3A:
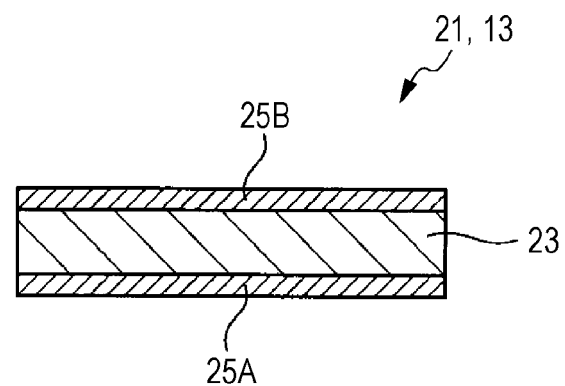
FIGS. 3A and 3B are schematic cross-sectional diagrams illustrating a specific configuration example and basic operations of a polymer actuator element.
Figure 3B:
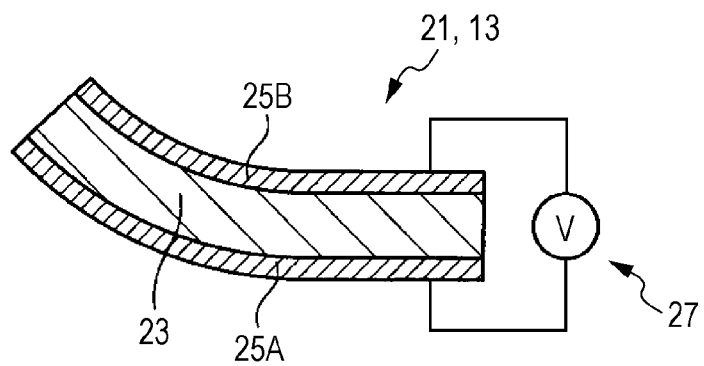

The above-mentioned displacement element 13 is, for example, a polymer actuator element. FIGS. 3A and 3B are schematic cross-sectional diagrams illustrating a specific configuration example and basic operations of a polymer actuator element. As shown in FIG. 3, the polymer actuator element 21 provided as the displacement element 13 has a cross-sectional structure in which a pair of electrode films 25A and 25B are adhered to both surfaces of an ion-conductive polymer compound film 23 (hereinafter simply referred to as a polymer compound film 23). In other words, the polymer actuator element 21 has the pair of electrode films 25A and 25B and the polymer compound film 23 interposed between the electrode films 25A and 25B. In addition, the entire polymer actuator element 21 or the exposed surfaces of the electrode films 25A and 25B may be covered with an insulating protective film made of a high elastic material (for example, polyurethane or the like). In addition, the polymer compound film 23 is also called an electro active polymer (EAP) sheet.

The above-mentioned polymer actuator element 21 is operated as follows. First, a description will be given of the case where a material including positive ions and a polar solvent is used as a positive ion material.

In this case, as shown in FIG. 3A, the polymer actuator element 21 in a state where a voltage is not applied is formed in a flat-plate shape without curvature since the positive ion materials are almost uniformly distributed in the polymer compound film 23. Here, as shown in FIG. 3B, in a state where a voltage is applied by using a voltage applying section 27, the polymer actuator element 21 performs the following operations. That is, for example, when a predetermined driving voltage is applied between the electrode films 25A and 25B such that the electrode film 25A has a negative potential and the electrode film 25B has a positive potential, positive ions are moved to the electrode film 25A side in a state where the positive ions are solvated in a polar solvent. At this time, since negative ions are rarely moved in the polymer compound film 23, in the polymer compound film 23, the electrode film 25A side is swelled, and the electrode film 25B side is contracted. Thereby, the polymer actuator element 21 is bent toward the electrode film 25B side as a whole. Thereafter, by eliminating the electric potential difference between the electrode films 25A and 25B, in a state where a voltage is not applied, the positive ion materials (the positive ions and the polar solvent), which are biased to the electrode film 25A side in the polymer compound film 23, are diffused, and the planar state shown in FIG. 3A is restored. Further, in the no-voltage applied state shown in FIG. 3A, when a predetermined driving voltage is applied between the electrode films 25A and 25B such that the electrode film 25A has a positive potential and the electrode film 25B has a negative potential, positive ions are moved to the electrode film 25B side in a state where the positive ions are solvated in a polar solvent. In this case, in the polymer compound film 23, the electrode film 25A side is contracted, and the electrode film 25B is swelled. Thus, the polymer actuator element 21 is bent toward the electrode film 25A side as a whole.

Next, a description will be given of a case of using ion liquid including liquid positive ions as positive ion materials.

In this case, as shown in FIG. 3A, in the no-voltage applied state, since the ion liquid is almost uniformly distributed in the polymer compound film 23, the polymer actuator element 21 is formed in a flat-plate shape. Here, as shown in FIG. 3B, in a state where a voltage is applied by using a voltage applying section 27, the polymer actuator element 21 performs the following operations. For example, a predetermined driving voltage is applied between the electrode films 25A and 25B such that the electrode film 25A has a negative potential and the electrode film 25B has a positive potential. Thereby, the positive ions are moved to the electrode film 25A side, but it is difficult for the negative ions to move in the polymer compound film 23 which is a positive ion exchange membrane. For this reason, in the polymer compound film 23, the electrode film 25A side is swelled, and the electrode film 25B side is contracted. Thereby, the polymer actuator element 21 is bent toward the electrode film 25B side as a whole. Thereafter, by eliminating the electric potential difference between the electrode films 25A and 25B, in a state where a voltage is not applied, the positive ions, which are biased to the electrode film 25A side in the polymer compound film 23, are diffused, and the planar state shown in FIG. 3A is restored. Further, in the no-voltage applied state shown in FIG. 3A, when a predetermined driving voltage is applied between the electrode films 25A and 25B such that the electrode film 25A has a positive potential and the electrode film 25B has a negative potential, positive ions in the ion liquid are moved to the electrode film 25B side. In this case, in the polymer compound film 23, the electrode film 25A side is contracted, and the electrode film 25B is swelled. Thus, the polymer actuator element 21 is bent toward the electrode film 25A side as a whole.

At the time of the driving mentioned above, it is preferable that a voltage (for example, about 3V) equal to or greater than the withstand voltage of the polymer actuator element 21 should not be applied to the electrode films 25A and 25B for a long period of time (for example, about 1 second). The reason is that, in such a manner, it is possible to improve durability of the polymer actuator element 21. In addition, the displacement element 13 is not limited to the above-mentioned polymer actuator element if it is a flat-plate-shaped element which is deformed by the application of the voltage. As another example of the displacement element 13, there is an element using for example a shape-memory alloy or a piezo element.

Further, the above-mentioned displacement element 13 is able to provide a larger thrust to the free end 13b as the length of the electrode terminal 19 is larger, and is able to increase an amount of displacement of the free end 13b as the length from the electrode terminal 19 to the free end 13b is larger. Hence, the planar shape of the displacement element 13 may be a simple rectangular shape as shown in the drawing, but may be a trapezoidal shape in which the length thereof on the free end 13b side is made to be shorter than the length thereof on the fixing portion 13a side if the free end 13b resides to be in contact with or be close to the upper surface of the mount 9b.

Push-Up Member 15

The push-up member 15 is provided on the free end 13b of the displacement element 13, and is inserted on one end surface side of the lens body 3 perpendicular to the optical axis z by approaching the lens body 3 of the displacement element 13. Thereby, the push-up member 15 is operable to push up the lens body 3 in the direction of the optical axis z.

The push-up member 15 is fixed onto the free end 13b so as to be protruded from the free end 13b of the displacement element 13 to the lens body 3 side, and is placed on the upper side of the mount 9b. The shape of the push-up member 15 is a right triangular prism shape which is thinner at the position closer to the tip thereof from the free end 13b, and has a surface which is fixed onto the free end 13b, a surface which is placed on the mount 9b, and a tilted surface which is tilted toward the lens body 3 side. Thereby, when the free end 13b of the displacement element 13 moves to be close to the lens body 3, the tip of the push-up member 15 is easily inserted between the mount 9b and the holder body 7 and lens holder 7a holding the lens body 3. Further, in accordance with the position of the inserted push-up member 15, the amount of displacement is adjusted in the direction of the optical axis z of the lens body 3. That is, the push-up member 15 is a member that pushes up the lens body 3 by changing the direction of force, which moves the push-up member 15 in the horizontal direction through the displacement of the free end 13b of the displacement element 13, into a direction perpendicular thereto.

When the tilt angle of the tilted surface pushing up the lens body 3 to the upper surface of the mount 9b is 45°, the push-up member 15 is able to convert the amount of displacement of the push-up member 15 caused by the curvature of the displacement element 13 into an amount of displacement (hereinafter referred to as an amount of elevation) in the direction of the optical axis z of the lens body 3 in one-to-one correspondence. Further, when the tilt angle of the tilted surface is less than 45°, the amount of elevation of the lens body 3 relative to the amount of displacement of the push-up member 15 decreases, and the pressing force necessary for the free end 13b of the displacement element 13 relative to the amount of displacement of the push-up member 15 decreases. In contrast, when the tilt angle of the tilted surface is greater than 45°, the amount of elevation of the lens body 3 relative to the amount of displacement of the push-up member 15 increases, and the pressing force necessary for the free end 13b of the displacement element 13 relative to the amount of displacement of the push-up member 15 increases. Accordingly, in accordance with the displacement characteristic of the displacement element 13, the tilt angle of the tilted surface of the push-up member 15 may be adjusted, and the thrust necessary for the elevating speed or the elevating of the lens body 3 may be adjusted by the tilt angle of the tilted surface of the push-up member 15. Furthermore, the amount of elevation of the lens body 3, that is, a stroke is adjusted by a height of the tilted surface of the push-up member 15.

In addition, the shape of the push-up member 15 is not limited to the triangular prism shape if the tip of the push-up member 15 is gradually thinned toward the mount 9b side, and the surface pushing up the lens body 3 may be formed in a curved shape.

When the above-mentioned push-up member 15 is inserted on one end surface side of the lens body 3 perpendicular to the optical axis z, it is important that the push-up member 15 is provided at a position where it does not overlap with the lens Ln of the lens body 3.

Further, a protrusion portion 15a, which is fit into the track a provided on the mount 9b, is provided on the surface of the push-up member 15 facing the mount 9b. In addition, when the track a is formed in a protruded line (a rail shape), a groove, into which the rail is fit, is provided on the surface of the push-up member 15 facing the mount 9b.

Here, in the lens body 3 or the holder body 7, a notched portion b is provided at the external corner portion serving as an introduction portion through which the tip of the push-up member 15 is inserted. Here, the notched portion b is provided on the holder body 7 and the lens holder 7a. Thereby, the lens body 3 and the holder bodies 7 are pressed only in the movement direction of the push-up member 15 by the displacement of the free end 13b of the displacement element 13. Thus, the displacement element 13 is prevented from being moved in a direction opposite to the press direction. In addition, in the lens body 3 or the holder body 7, the notched portion b may be formed in a round shape where the external corner portion serving as an introduction portion, through which the tip of the push-up member 15 is inserted, is rounded.

Furthermore, in the lens body 3 or the holder body 7, the portion, into which the tip of the push-up member 15 is inserted, may be shaped along the tilted surface of the push-up member 15. Thereby, in a state where the lens body 3 is pushed up, the shaped surface can be in contact with the tilted surface of the push-up member 15, and thus it is possible to stabilize the state.

In addition, the contact surface between the push-up member 15 and the mount 9b may be made of a material which is slippery.

Driving of Lens Module of First Embodiment

Next, driving of the lens module 1-1 will be described. First, as shown in FIGS. 1 and 2A, in the state where a voltage is not applied to the displacement element 13, the displacement element 13 is kept flat without curvature. Hence, the push-up member 15 is not inserted under the holder body 7 and lens holder 7a. Accordingly, four supporting bodies 11 formed of elastic wires are kept linear, and thus the lens body 3 is held directly above the mount 9b.

On the other hand, as shown in FIG. 2B, by applying a voltage to the displacement element 13, in the state where the displacement element 13 is bent, the push-up member 15 fixed onto the free end 13b of the displacement element 13 is moved. The movement of the push-up member 15 is guided by the provided track a in accordance with the displacement of the free end 13b. Thereby, the push-up member 15 is inserted under the holder body 7 and the lens holder 7a, and is thus able to push up the lens body 3 held by the holder bodies 7. At this time, the holder bodies 7 and the wall section 9a of the fixing body 9 are connected through the four supporting bodies 11 formed of elastic wires with the same lengths. Hence, it is possible to push up the lens body 3 in the direction of the optical axis z without tilting the optical axis z with the holder bodies 7 and the wall section 9a of the fixing body 9 opposed to each other. In particular, the twist-proof bodies 17 are provided at the connecting portions between the supporting bodies 11 and the holder bodies 7 and the connecting portions between the respective supporting bodies 11 and the wall section 9a of the fixing body 9 such that the supporting bodies 11 are curved only toward the inner surface parallel with the optical axis z. Thereby, it is possible to reliably maintain the state where the holder bodies 7 and the wall section 9a of the fixing body 9 are opposed to each other. As a result, it is possible to move up the lens body 3 in the direction of the optical axis z without tilting the optical axis z, that is, without tilting.

Further, in this state, when the application of the voltage to the displacement element 13 is stopped, as shown in FIG. 2A, the displacement element 13 is restored from the bent state to the planar shape. Thereby, the push-up member 15, which was inserted under the holder body 7 and lens holder 7a, is extracted from the lower side of the holder body 7 and lens holder 7a. Then, the supporting bodies 11 are restored to be linear, and the lens body 3 is pulled back to a position directly above the mount 9b without tilting the optical axis z.

In the above-mentioned driving, the amount of elevation in the direction of the optical axis z of the lens body 3 is controlled by the amount of displacement of the free end 13b of the displacement element 13, that is, the amount of the voltage applied to the displacement element 13, and the height of the tilted surface of the push-up member 15. Further, as described in the configuration of the above-mentioned displacement element 13, the bending direction of the displacement element 13 is controlled in accordance with the state where a voltage is applied to the electrodes constituting the displacement element 13.

Effect of Lens Module of First Embodiment

In the lens module 1-1 according to the first embodiment mentioned above, the lens body 3 with the direction of the optical axis z maintained is moved by the displacement of the displacement element 13, which is disposed along the optical axis z so as to be lateral to the lens body 3. In addition, the elastic wire provided as the supporting body 11 may be formed as a needle-like thing which is very thin. Hence, as compared with the configuration in which the displacement element 13 overlaps with the direction of the optical axis z of the lens body 3 or the lens body 3 is held on the end portion of the displacement element 13, it is possible to decrease the size and thickness of the lens module. Thereby, relative to the diameter of the lens Ln, the outer diameter of the lens module 1-1 can be decreased.

Further, it is preferable that the displacement element 13 should have a function of displacing the free end 13b. Hence, it is preferable that the element should have a simple rectangular shape or trapezoidal shape. Accordingly, for example, if the element is the polymer actuator element, the shape of the EAP sheet is simplified. Therefore, for example, as compared with the case where the polymer actuator element overlaps with the optical axis side of the lens body, the yield of the EAP sheet (that is, the polymer actuator element) per sheet dramatically increases, and thus it is possible to reduce costs.

2. Second Embodiment

Lens Module Using Flat Plate in Supporting Body

Figure 4:
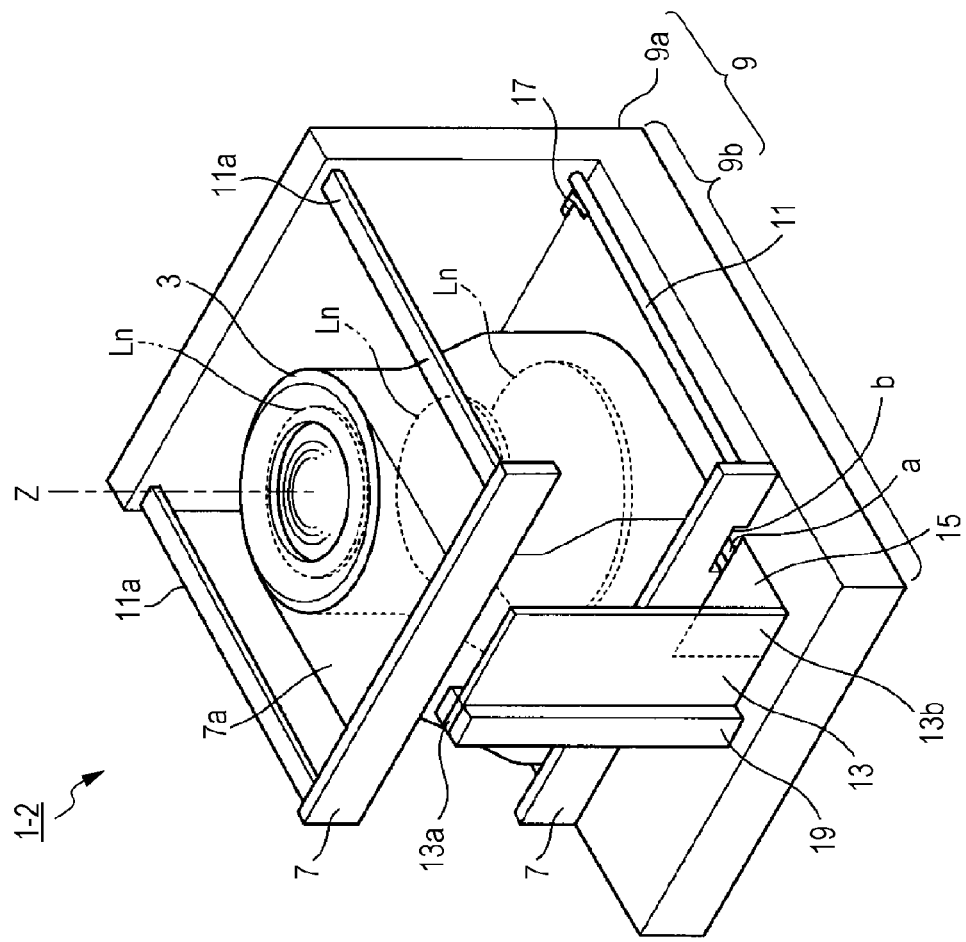
FIG. 4 is a perspective view illustrating a configuration of a lens module according to a second embodiment.

FIG. 4 is a perspective view illustrating a configuration of a lens module according to a second embodiment. Hereinafter, referring to FIG. 4, a description will be given of a configuration of the lens module and driving of the lens module according to the second embodiment. In addition, in the case where elements common to the lens module described in the first embodiment exist, those elements will be referenced by the same reference numerals and signs, and repeated description thereof will be omitted.

Configuration of Lens Module of Second Embodiment

The lens module 1-2 shown in FIG. 4 is different from the lens module according to the first embodiment in that planar supporting bodies 11a, which are constituted by thin and flat plates, are suspended between the holder body 7 and the wall section 9a of the fixing body 9, but the other configuration is the same. Each planar supporting body 11a is formed of, for example, a metal material with rigidity, and is constituted by a flat plate which is thin in the direction of the optical axis z of the lens body 3. Thereby, the planar supporting body 11a has flexibility only in the thickness direction of the thin plate, that is, the direction parallel with the optical axis z, and has a restorative power to return to the linear shape through the rigidity of the metal material even when it is bent.

Two planar supporting bodies 11a are disposed at a position where the lens body 3 is interposed therebetween in a portion where the diameter of the lens body 3 is relatively small. The planar supporting bodies 11a are disposed at, for example, the same height from the optical axis z. Further, in a portion where the diameter of the lens body 3 is relatively large, in the same state described in the first embodiment, the two supporting bodies 11 formed of elastic wires are disposed.

The supporting bodies 11 and the planar supporting bodies 11a have the same length and equivalent restorative force. Thereby, in a normal state where force is not applied to the lens body 3, the supporting bodies 11 and 11a are held at 90° with respect to the holder bodies 7 and the wall section 9a of the fixing body 9, and the supporting bodies 11 and 11a are held at 90° with respect to the optical axis z of the lens body 3. Further, even in the case where force is applied to the holder bodies 7 and the lens body 3, each supporting body 11 tends to be restored to this state.

In addition, the twist-proof bodies 17 are provided at the connecting portions between the supporting bodies 11 formed of elastic wires and the holder bodies 7 and the connecting portions between the respective supporting bodies 11 and the fixing body 9 such that the supporting bodies 11 are curved only toward the inner surface parallel with the optical axis z. Meanwhile, the planar supporting bodies 11a have flexibility only in the thickness direction of the thin plate, that is, the direction parallel with the optical axis z. Hence, it is not necessary to provide the twist-proof bodies 17 at the connecting portions between the supporting bodies 11a and the holder body 7 and the connecting portions between the supporting bodies 11a and the fixing body 9.

Driving of Lens Module of Second Embodiment

Driving of the above-mentioned lens module 1-2 is operated in the same manner as the driving of the lens module according to the first embodiment.

Effect of Lens Module of Second Embodiment

In the lens module 1-2 according to the second embodiment mentioned above, also the lens body 3 with the direction of the optical axis z maintained is moved by the displacement of the displacement element 13, which is disposed along the optical axis z so as to be lateral to the lens body 3. Hence, it is possible to obtain the same effect as the lens module according to the first embodiment. Further, by providing the planar supporting bodies 11a, it is possible to maintain a stable posture of the lens body 3 without tilting. Furthermore, by providing the planar supporting bodies 11a, it is not necessary to provide the twist-proof bodies 17 at the connecting portions. Hence, it is possible to reduce the number of components as compared with the lens module according to the first embodiment. In addition, in the configuration of the second embodiment, the two planar supporting bodies 11a are disposed in the portion where the diameter of the lens body 3 is relative small. However, if there is a room for arrangement of the supporting bodies, the other supporting bodies 11 may be replaced with the planar supporting bodies 11a.

3. Third Embodiment

Lens Module Using Link Bar in Supporting Body

Figure 5:
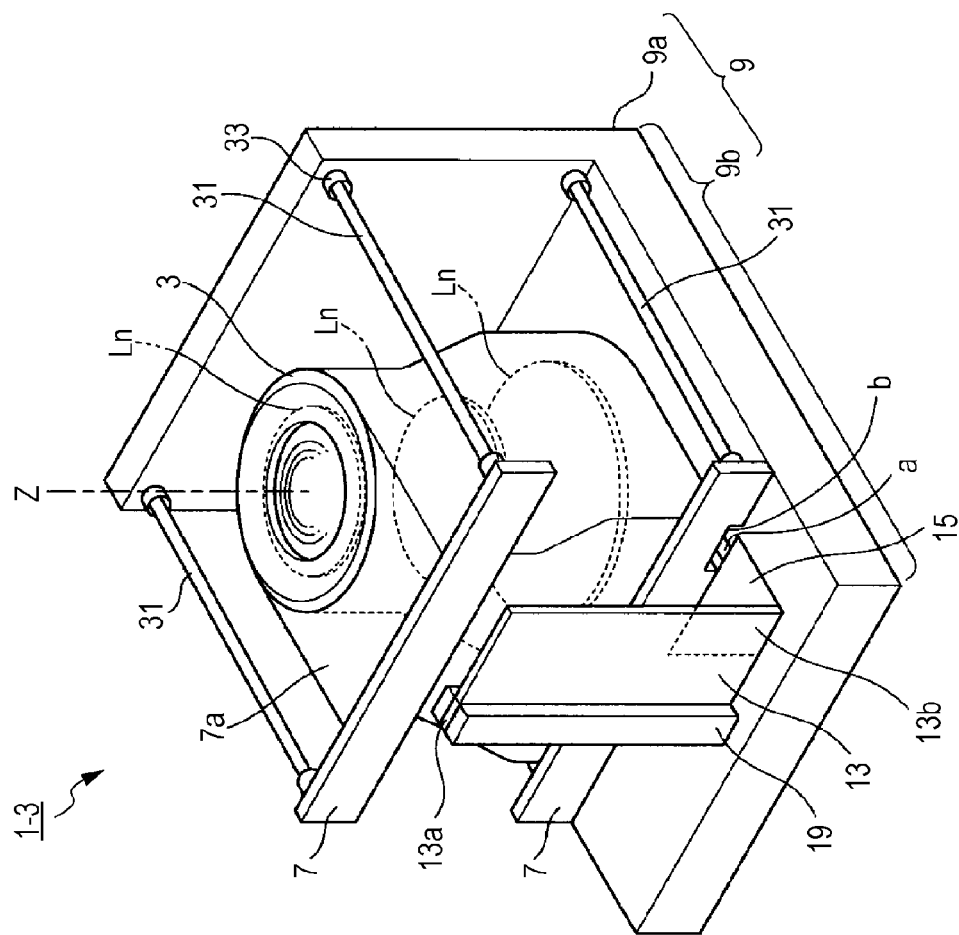
FIG. 5 is a perspective view illustrating a configuration of a lens module according to a third embodiment.

FIG. 5 is a perspective view illustrating a configuration of a lens module according to a third embodiment. FIGS. 6A and 6B are side views and bottom plan views illustrating a configuration and driving of the lens module according to the third embodiment. Hereinafter, referring to the drawings, a description will be given of a configuration of the lens module and driving of the lens module according to the third embodiment. In addition, in the case where elements common to the lens module described in the first embodiment exist, those elements will be referenced by the same reference numerals and signs, and repeated description thereof will be omitted.

Configuration of Lens Module of Third Embodiment

The lens module 1-3 shown in FIGS. 5, 6A, and 6B is different from the lens module according to the first embodiment in that link bars 31 as the supporting bodies and connecting members 33 are provided between the holder bodies 7 and the wall section 9a of the fixing body 9. Each link bar 31 is suspended between the holder body 7 and the wall section 9a of the fixing body 9. Further, the connecting members 33, which rotatably connect the link bars 31, are provided at the connecting portions between the link bars 31 and the wall section 9a of the fixing body 9 and the connecting portions between the link bars 31 and the holder bodies 7.

Link Bar 31

The plurality of link bars 31 is suspended between the holder bodies 7 and the wall section 9a of the fixing body 9, and constitutes a link mechanism parallel along the side wall of the lens body 3. It is preferable that each link bar 31 should have the same length and should be formed of a material which has rigidity and is prevent from being bent, and the section shape thereof may be a flat-plate shape, a circular shape, an elliptical shape, or the like, and is not particularly limited.

Regarding arrangement of the respective link bars 31 mentioned above, similarly to the arrangement of the supporting bodies described in the first embodiment, two link bars 31 are disposed at each position where the lens body 3 is interposed from the direction of the side wall, that is, a total of four supporting bodies 11 are disposed. The two link bars 31 and 31, which are disposed on one side of the lens body 3, are disposed at positions with different heights along the optical axis z, and constitute a parallel link mechanism, together with the holder bodies 7 and the wall section 9a of the fixing body 9. Further, the two link bars 31 and 31, which are disposed on the other side of the lens body 3, are disposed at positions with different heights along the optical axis z, and constitute a parallel link mechanism, together with the holder bodies 7 and the wall section 9a of the fixing body 9. Here, the pair of link bars 31 and 31 disposed with the lens body 3 interposed therebetween is disposed, for example, at the same height relative to the optical axis z.

Thereby, one parallel link mechanism is disposed with the lens body 3 interposed from the direction of the side wall at the same height with respect to the optical axis z, where the parallel link mechanism includes two link bars 31 and 31 arranged in one direction of the optical axis z, the wall section 9a of the fixing body 9, and the holder body 7.

Connecting Member 33

The connecting members 33 are members for rotatably connecting the respective link bars 31 to the holder bodies 7 and the wall section 9a of the fixing body 9. Each connecting member 33 maintains a regular posture of the link bar 31 which is suspended between the holder body 7 and the wall section 9a of the fixing body 9, and connects the link bar 31 rotatably on a plane parallel with the optical axis z by applying force to the link bar 31. Here, in an initial state where force is not applied to the lens body 3, as shown in the side view of FIG. 6A, the inner angle θ (here, the angle is an angle formed between each link bar 31 and the wall section 9a of the fixing body 9) of the parallel link mechanism is maintained at 90°. As such a connecting member 33, for example, an elastic hinge, a stopper-attached hinge, a coil spring, and the like are used.

Driving of Lens Module of Third Embodiment

Next, driving of the lens module 1-3 will be described. First, as shown in FIGS. 5 and 6A, in the state where a voltage is not applied to the displacement element 13, the displacement element 13 is kept flat without curvature. Hence, the push-up member 15 is not inserted under the holder body 7 and lens holder 7a.

In this state, no force is applied to the four link bars 31. Accordingly, the parallel link mechanism including the link bars 31, the holder bodies 7, and the wall section 9a of the fixing body 9 is held at the inner angle θ of 90° in a rectangle, and the lens body 3 is held directly above the mount 9b.

On the other hand, as shown in FIG. 6B, by applying a voltage to the displacement element 13, in the state where the displacement element 13 is bent toward the lens body 3 side, the push-up member 15 fixed onto the free end 13b of the displacement element 13 is moved. The movement of the push-up member 15 is guided by the provided track a in accordance with the displacement of the free end 13b. Thereby, the push-up member 15 is inserted under the holder body 7 and the lens holder 7a, thereby pushing up the lens body 3 held by the holder bodies 7.

At this time, the holder bodies 7 and the wall section 9a of the fixing body 9 are connected through the four link bars 31 with the same lengths. Hence, it is possible to push up the lens body 3 in the direction of the optical axis z without tilting the optical axis z with the holder bodies 7 and the wall section 9a of the fixing body 9 opposed to each other. In particular, the connecting members 33, which connect the link bars 31 rotatably on a plane parallel with the optical axis z, are provided at the connecting portions between the link bars 31 and the holder bodies 7 and the connecting portions between the respective link bars 31 and the wall section 9a of the fixing body 9. Thereby, Thereby, it is possible to reliably maintain the state where the holder bodies 7 and the wall section 9a of the fixing body 9 are opposed to each other. As a result, it is possible to move up the lens body 3 in the direction of the optical axis z without tilting the optical axis z. In this state, in the parallel link mechanism including the link bars 31, the holder bodies 7, and the wall section 9a of the fixing body 9, the inner angle θ formed between each link bar 31 and the wall section 9a of the fixing body 9 is changed to an inner angle θ of $(90+\alpha)°$.

Further, in this state, when the application of the voltage to the displacement element 13 is stopped, as shown in FIG. 6A, the displacement element 13 is restored from the bent state to the planar shape. Thereby, the push-up member 15, which was inserted under the holder body 7 and lens holder 7a, is extracted from the lower side of the holder body 7 and lens holder 7a. Then, the inner angle θ of the parallel link mechanism including the link bars 31, the holder bodies 7, and the wall section 9a of the fixing body 9 is returned to the inner angle θ of 90°, and thus the lens body 3 is pulled back to the initial position directly above the mount 9b without tilting the optical axis z.

In the above-mentioned driving, the amount of elevation in the direction of the optical axis z of the lens body 3 is controlled by the amount of displacement of the free end 13b of the displacement element 13, that is, the amount of the voltage applied to the displacement element 13, and the height of the tilted surface of the push-up member 15. Further, as described in the configuration of the above-mentioned displacement element 13, the bending direction of the displacement element 13 is controlled in accordance with the state where a voltage is applied to the electrodes constituting the displacement element 13.

Effect of Lens Module of Third Embodiment

In the lens module 1-3 according to the third embodiment mentioned above, also the lens body 3 with the direction of the optical axis z maintained is moved by the displacement of the displacement element 13, which is disposed along the optical axis z so as to be lateral to the lens body 3. Hence, it is possible to obtain the same effect as the lens module according to the first embodiment.

4. Fourth Embodiment

Lens Module in which Both Ends of Displacement Element are Formed as Free Ends

FIG. 7 is a perspective view illustrating a configuration of a lens module according to a fourth embodiment. FIGS. 8A and 8B are side views and bottom plan views illustrating a configuration and driving of the lens module according to the fourth embodiment. Hereinbelow, referring to the drawings, a description will be given of the configuration of the lens module and the driving of the lens module according to the fourth embodiment. In addition, in the case where elements common to the lens module described in the first embodiment exist, those elements will be referenced by the same reference numerals and signs, and repeated description thereof will be omitted.

Configuration of Lens Module of Fourth Embodiment

The lens module 1-4 shown in FIGS. 7, 8A, and 8B is different from the lens module according to the first embodiment in positions at which two free ends 13b and 13b are provided on the displacement element 13, but the other configuration is the same. That is, the displacement element 13 is disposed to be lateral to the lens body 3 along the optical axis z on the holder body 7 side, and the center portion thereof parallel with the optical axis z is fixed onto the mount 9b of the fixing body 9 by the fixing portion 13a. The fixing portion 13a interconnects the electrode terminals 19 throughout the entire length thereof. In addition, both end edges of the displacement element 13 relative to the fixing portion 13a are formed as the free ends 13b and 13b. Thereby, when the displacement element 13 is deformed by applying a voltage from the electrode terminal 19 to the fixing portion 13a of the displacement element 13, the free ends 13b and 13b disposed at both ends of the displacement element 13 are displaced to freely approach the lens body 3.

In addition, the planar shape of the displacement element 13 may be a simple rectangular shape as shown in the drawing, but may be a trapezoidal shape in which the length thereof on each side of the free ends 13b is made to be shorter than the length thereof on the fixing portion 13a side if each of the free ends 13b and 13b resides to be in contact with or be close to the upper surface of the mount 9b. Furthermore, the displacement element 13 is configured to have two displacement elements divided in the fixing portion 13a. The displacement element 13 may employ the above-mentioned polymer actuator element if it is a flat-plate-shaped element which is deformed by the application of the voltage. Further, as another example, similarly to the first embodiment, the element may use for example a shape-memory alloy or a piezo element.

The push-up members 15 are respectively fixed on the two free ends 13b and 13b of the above-mentioned displacement element 13. The push-up members 15 are the same as the push-up member 15 described in the first embodiment, and are inserted on one end surface side of the lens body 3 perpendicular to the optical axis z by approaching the lens body 3 of the displacement element 13. With such a configuration, the push-up members 15 are operable to push up the lens body 3 in the direction of the optical axis z.

The respective above-mentioned push-up members 15 are disposed at a certain distance away from each other on both sides of the holder body 7 with the optical axis z interposed therebetween. Further, when the respective push-up members 15 are inserted on one end surface side of the lens body 3 perpendicular to the optical axis z, similarly to first embodiment, it is important that the push-up members 15 are provided at a position where it does not overlap with the lens Ln of the lens body 3.

Further, the tracks a, into which the push-up members 15 are fit, are respectively provided on the upper surface of the mount 9b facing the respective push-up members 15. Each track a is disposed along the path of the movement of the push-up member 15 based on the displacement of each free end 13b of the displacement element 13, and is formed in, for example, a groove shape shown in the drawing, or a protruded line shape (a rail shape).

Further, protrusion portions 15a, which are fit into the tracks a provided on the mount 9b, are provided on the surfaces of the respective push-up members 15 facing the mount 9b. In addition, when each track a is formed in a protruded line (a rail shape), a groove, into which the rail is fit, is provided on the surface of the push-up member 15 facing the mount 9b.

Furthermore, in the lens body 3 or the holder body 7, notched portions b are provided at the external corner portions serving as introduction portions through which the tips of the push-up members 15 are inserted. Thereby, the lens body 3 and the holder bodies 7 are pressed only in the movement direction of each push-up member 15 by the displacement of each free end 13b of the displacement element 13.

Thus, the displacement element 13 is prevented from being moved in a direction opposite to the press direction. In addition, in the lens body 3 or the holder body 7, the notched portions b may be formed in round shapes where the respective external corner portions serving as introduction portions, through which the tips of the two push-up members 15 are inserted, are rounded.

Furthermore, in the lens body 3 or the holder body 7, each portion, into which the tip of each push-up member 15 is inserted, may be shaped along the tilted surface of the push-up member 15. Thereby, in a state where the lens body 3 is pushed up, the shaped surface can be in contact with the tilted surface of the push-up member 15, and thus it is possible to stabilize the state.

In addition, the contact surface between the push-up member 15 and the mount 9b may be made of a material which is slippery, similarly to the first embodiment.

Driving of Lens Module of Fourth Embodiment

Driving of the above-mentioned lens module 1-4 is operated in the same manner as the driving of the lens module according to the first embodiment. At this time, the lens body 3 is elevated by the movement of the respective push-up members 15 fixed onto the two free ends 13b and 13b provided on the displacement element 13.

Effect of Lens Module of Fourth Embodiment

In the lens module 1-4 according to the fourth embodiment mentioned above, the lens body 3 with the direction of the optical axis z maintained is moved by the displacement of the displacement element 13, which is disposed along the optical axis z so as to be lateral to the lens body 3. Hence, it is possible to obtain the same effect as the lens module according to the first embodiment. Furthermore, in the lens module 1-4 according to the fourth embodiment, the two push-up members 15 are disposed at a certain distance away from each other on both sides of the holder body 7 with the optical axis z interposed therebetween. Therefore, the force for elevating the lens body 3 is strong, and the configuration is highly effective in elevating the lens body 3 without tilting with respect to the optical axis z.

In addition, in the fourth embodiment, it is possible to use planar supporting bodies according to combination with the second embodiment, and thus it is possible to obtain the same effect as the second embodiment through the combination. Further, in the fourth embodiment, the parallel link mechanism according to combination with the third embodiment may be employed.

5. Fifth Embodiment

Lens Module in which Lower End of Displacement Element is Formed as Free End

Figure 10A:
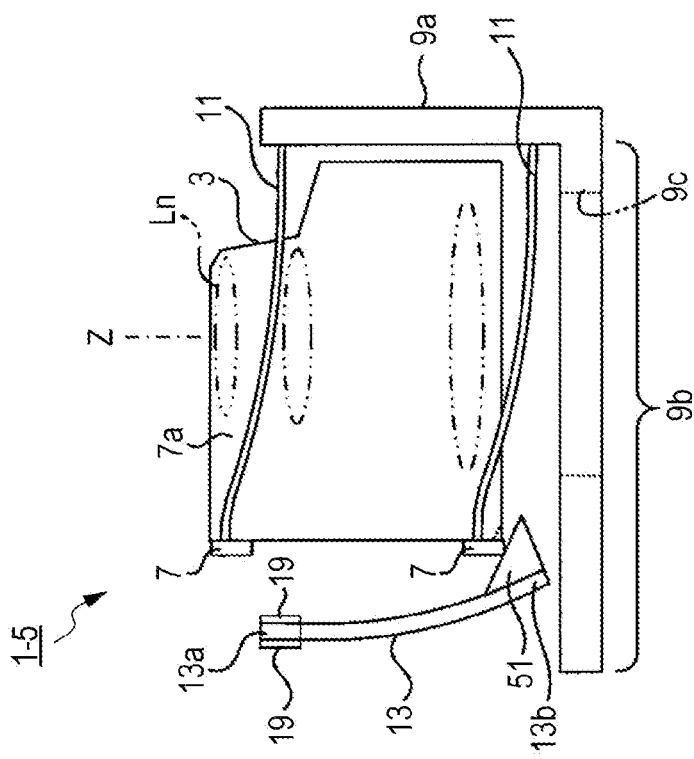
FIGS. 10A and 10B are side views illustrating a configuration and driving of the lens module according to the fifth embodiment.
Figure 10B:
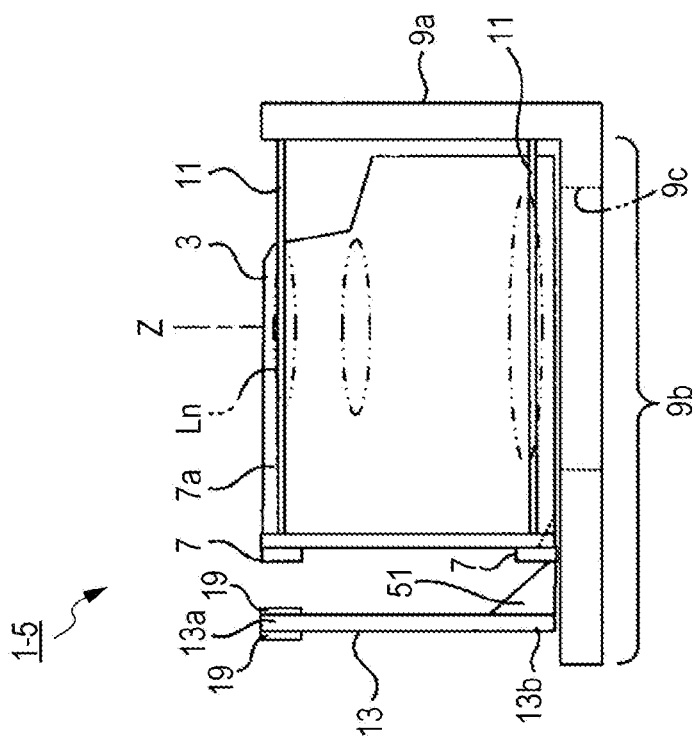

FIG. 9 is a perspective view illustrating a configuration of a lens module according to a fifth embodiment. FIGS. 10A and 10B are side views illustrating a configuration and driving of the lens module according to the fifth embodiment. Hereinbelow, referring to the drawings, a description will be given of the configuration of the lens module and the driving of the lens module according to the fifth embodiment. In addition, in the case where elements common to the lens module described in the first embodiment exist, those elements will be referenced by the same reference numerals and signs, and repeated description thereof will be omitted.

Configuration of Lens Module of Fifth Embodiment

The lens module 1-5 shown in FIGS. 9, 10A, and 10B is different from the lens module according to the first embodiment in that the fixing portion 13a and the free end 13b of the displacement element 13 are set on an end edge perpendicular to the optical axis z of the lens body 3. Further, a push-up member 51 fixed onto the free end 13b is provided to extend in a direction perpendicular to the optical axis of the lens body 3 in the free end 13b. The other configuration is the same as that of the first embodiment.

Displacement Element 13

That is, the flat-plate-shaped displacement element 13 is disposed to be lateral to the lens body 3 along the optical axis z on the holder body 7 side, and the end edge thereof perpendicular to the optical axis z is formed as the fixing portion 13a, and is fixed onto, for example, the mount 9b of the fixing body 9 by a member not shown in the drawing. The fixing portion 13a interconnects the electrode terminals 19 throughout the entire length thereof. In the displacement element 13, the other end edge, which is positioned at the end perpendicularly downward from the fixing portion 13a to the mount 9b, is formed as the free end 13b. The free end 13b is disposed to be close to the upper surface of the mount 9b. Thereby, when the displacement element 13 is deformed by applying a voltage from the electrode terminal 19 to the displacement element 13, the free end 13b of the displacement element 13 is displaced to freely approach one end surface side (here, the lower end surface) of the lens body 3 perpendicular to the optical axis z.

In addition the planar shape of the displacement element 13 may be a simple rectangular shape as shown in the drawing. Thereby, it is possible to secure the length necessary for connection between the fixing portion 13a and the electrode terminals 19, and it is possible to secure the length of the push-up member 51 which is fixed onto the free end 13b. Furthermore, the displacement element 13 may employ the above-mentioned polymer actuator element if it is a flat-plate-shaped element which is deformed by the application of the voltage. Further, as another example, similarly to the first embodiment, the element may use for example a shape-memory alloy or a piezo element.

Push-Up Member 51

The push-up member 51 is provided on the free end 13b of the displacement element 13 throughout the entire length of the free end 13b. The push-up member 51 is inserted on one end surface side of the lens body 3 perpendicular to the optical axis z by approaching the lens body 3 of the displacement element 13. Thereby, the push-up member 51 is operable to push up the lens body 3 in the direction of the optical axis z.

The push-up member 51 is fixed onto the free end 13b so as to be protruded from the free end 13b of the displacement element 13 to the lens body 3 side, and is placed on the upper side of the mount 9b. The shape of the push-up member 51 is a right triangular prism shape which is thinner at the position closer to the tip thereof from the free end 13b, and has a surface which is fixed onto the free end 13b, a surface which is placed on the mount 9b, and a tilted surface which is tilted toward the lens body 3 side. Thereby, when the free end 13b of the displacement element 13 moves to be close to the lens body 3, the tip of the push-up member 51 is easily inserted between the mount 9b and the holder body 7 and lens holder 7a holding the lens body 3. Further, in accordance with the position of the inserted push-up member 51, the amount of displacement is adjusted in the direction of the optical axis z of the lens body 3. That is, the push-up member 51 is a member that pushes up the lens body 3 by changing the direction of force, which moves the push-up member 51 in the horizontal direction through the displacement of the free end 13b of the displacement element 13, into a direction perpendicular thereto.

In the push-up member 51, the tilted surface, which pushes up the lens body 3 from the upper surface of the mount 9b, is shaped to have an angle capable of effectively pushing up the lens body 3. Further, when the push-up member 51 is inserted on one end surface side of the lens body 3 perpendicular to the optical axis z, it is important that the push-up member 51 is provided at a position where it does not overlap with the lens Ln of the lens body 3.

Here, in the lens body 3 or the holder body 7, a notched portion b is provided at the external corner portion serving as an introduction portion through which the tip of the push-up member 51 is inserted. Here, the notched portion b is provided on the holder body 7 and the lens holder 7a. Thereby, the lens body 3 and the holder bodies 7 are pressed only in the movement direction of the push-up member 51 by the displacement of the free end 13b of the displacement element 13. Thus, the displacement element 13 is prevented from being moved in a direction opposite to the press direction. In addition, in the lens body 3 or the holder body 7, the notched portion b may be formed in a round shape where the external corner portion serving as an introduction portion, through which the tip of the push-up member 51 is inserted, is rounded.

Driving of Lens Module of Fifth Embodiment

Next, driving of the lens module 1-5 will be described. First, as shown in FIGS. 9 and 10A, in the state where a voltage is not applied to the displacement element 13, the displacement element 13 is kept flat without curvature. Hence, the push-up member 51 is not inserted under the holder body 7 and lens holder 7a. Accordingly, four supporting bodies 11 formed of elastic wires are kept linear, and thus the lens body 3 is held directly above the mount 9b.

On the other hand, as shown in FIG. 10B, by applying a voltage to the displacement element 13, in the state where the displacement element 13 is bent, the push-up member 51 fixed on the free end 13b of the displacement element 13 is moved, and is thereby inserted under the holder body 7 and the lens holder 7a. Thereby, it is possible to push up the lens body 3 held by the holder bodies 7. At this time, the holder bodies 7 and the wall section 9a of the fixing body 9 are connected through the four supporting bodies 11 formed of elastic wires with the same lengths. Thus, similarly to the first embodiment, by further providing the twist-proof bodies 17, it is possible to push up the lens body 3 in the direction of the optical axis z without tilting the optical axis z. Furthermore, the push-up member 51, which is provided to extend in a direction perpendicular to the optical axis z, is entirely inserted under the holder body 7 and the lens holder 7a. Thereby, the optical axis z is prevented from being tilted.

Further, in this state, when the application of the voltage to the displacement element 13 is stopped, as shown in FIG. 10A, the displacement element 13 is restored from the bent state to the planar shape. Thereby, the push-up member 51, which was inserted under the holder body 7 and lens holder 7a, is extracted from the lower side of the holder body 7 and lens holder 7a. Then, the supporting bodies 11 are restored to be linear, and the lens body 3 is pulled back to a position directly above the mount 9b without tilting the optical axis z.

In the above-mentioned driving, the amount of elevation in the direction of the optical axis z of the lens body 3 is controlled by the amount of displacement of the free end 13b of the displacement element 13, that is, the amount of the voltage applied to the displacement element 13, and the height of the tilted surface of the push-up member 51. Further, as described in the configuration of the above-mentioned displacement element 13, the bending direction of the displacement element 13 is controlled in accordance with the state where a voltage is applied to the electrodes constituting the displacement element 13.

Effect of Lens Module of Fifth Embodiment

In the lens module 1-5 according to the fifth embodiment mentioned above, also the lens body 3 with the direction of the optical axis z maintained is moved by the displacement of the displacement element 13, which is disposed along the optical axis z so as to be lateral to the lens body 3. Hence, it is possible to obtain the same effect as the lens module according to the first embodiment. Furthermore, in the lens module 1-5 according to the fifth embodiment, by using the push-up member 51, which is provided to extend in a direction perpendicular to the optical axis z, it is possible to apply force to the holder body 7 holding the lens body 3 in a wide range. Accordingly, it is possible to effectively obtain the force for elevating the lens body 3, and the configuration is highly effective in preventing the optical axis z from being tilted.

In addition, in the fifth embodiment, it is possible to use planar supporting bodies according to combination with the second embodiment, and thus it is possible to obtain the same effect as the second embodiment through the combination. Further, in the fifth embodiment, the parallel link mechanism according to combination with the third embodiment may be employed.

6. Sixth Embodiment

Image Capturing Device

Figure 11:
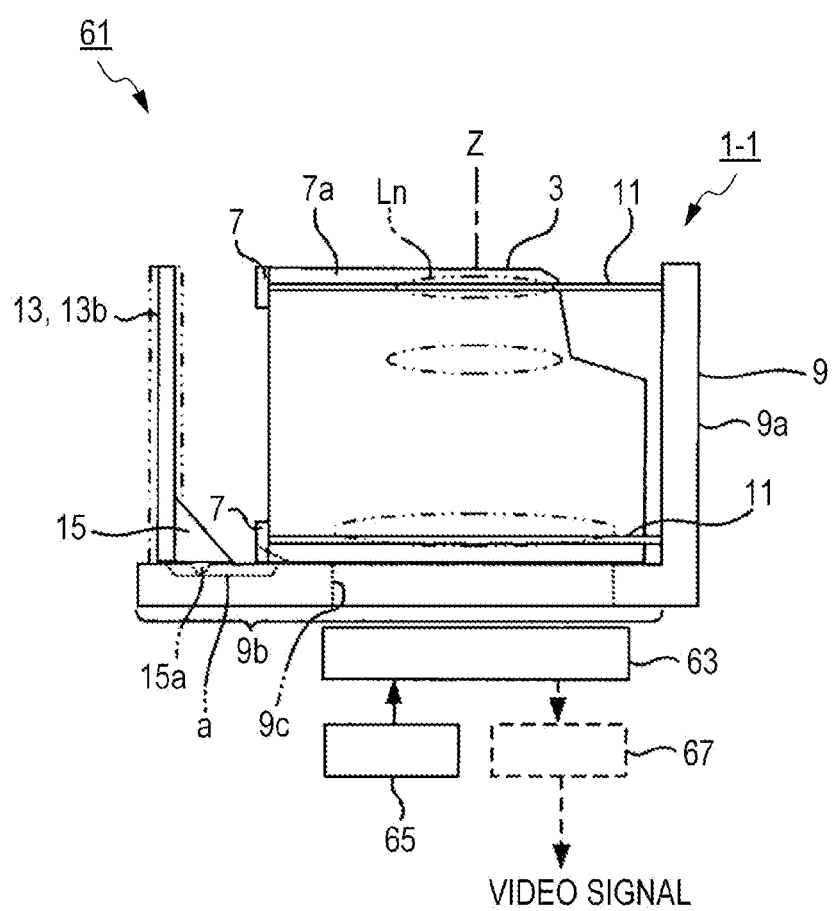
FIG. 11 is a configuration diagram illustrating an image capturing device according to a sixth embodiment.

Next, a configuration of an image capturing device according to a sixth embodiment of the present technology will be described. FIG. 11 is a configuration diagram illustrating an image capturing device 61 using the lens module according to the embodiment of the present technology. The image capturing device 61 shown in the drawing uses, as an autofocus module, the above-mentioned lens module (here, the lens module 1-1 according to the first embodiment as a representative) according to the embodiment of the present technology. The image capturing device 61 includes, together with the lens module 1-1, a solid-state imaging element 63, and a driving circuit 65, and as necessary, further includes a signal processing circuit 67.

The solid-state imaging element 63 is an element that acquires an imaging signal of an image formed by the lens body 3 constituting the lens module 1-1. The solid-state imaging element 63 includes an image sensor equipped with, for example, a CCD (Charge Coupled Device) or a CMOS (Complementary Metal Oxide Semiconductor). The solid-state imaging element 63 is disposed at a position where it overlaps with the direction of the optical axis z of the lens module 1-1. More specifically, the solid-state imaging element 63 is disposed to overlap with the lens module 1-1 such that the light receiving surface of the image sensor in the solid-state imaging element 63 is on the optical axis z of the lens body 3 and is perpendicular to the optical axis z. For example, when the solid-state imaging element 63 is disposed on the mount 9b side of the fixing body 9, the solid-state imaging element 63 is disposed such that the light receiving surface of the image sensor is opposed to the opening 9c provided on the mount 9b.

The lens module 1-1 and solid-state imaging element 63 is fixed in the casing of the image capturing device which is not shown herein.

Further, the driving circuit 65 is to drive the solid-state imaging element 63, and controls accumulating and reading of signal charges which are photoelectrically converted by the image sensor. The driving circuit 65 may be provided as an external circuit of the solid-state imaging element 63, but may be formed as an internal circuit in the solid-state imaging element 63.

Further, the signal processing circuit 67 processes the signal, which is read by the driving circuit 65, as a video signal, and thus outputs the video signal, which is subjected to the signal processing, to a storage medium such as a memory or a monitor as necessary.

In the image capturing device 61 with such a configuration, the lens body 3 of the lens module 1-1 forms an image of light (incident light), which is originated from the object, on the light receiving surface of the solid-state imaging element 63. At this time, through the driving of the driving circuit 65, signal charges are accumulated in the solid-state imaging element 63 for a certain period of time, and then the signal charges are read, thereby obtaining a video signal.

The image capturing device 61 with the above-mentioned configuration is able to achieve a decrease in size and a decrease in thickness thereof by using the lens module 1-1 according to the embodiment of the present technology as an autofocus module. As a result, in the image capturing device 61 for which high image quality is necessary, a lens with a large diameter is necessary. However, even in this case, the image capturing device 61 is also able to achieve a decrease in size and a decrease in thickness thereof.

7. Seventh Embodiment

Electronic Apparatus

Next, an exemplary configuration of an electronic apparatus according to a seventh embodiment of the present technology will be described. FIGS. 12A and 12B are perspective views illustrating a schematic configuration of a mobile phone (mobile phone 100) having an image capturing function as an example of the electronic apparatus.

In the mobile phone 100, two casings 101A and 101B are foldably connected through a hinge mechanism which is not shown in the drawing.

As shown in FIG. 12A, a plurality of various operation keys 102 is arranged on one side of the casing 101A, and a microphone 103 is disposed on the lower end portion thereof. The operation key 102 is to receive a predetermined operation of a user and input information. The microphone 103 is to input voice of a user for duration of call.

Further, as shown in FIG. 12A, a display section 104 using for example a liquid crystal display panel or the like is disposed on one side of the casing 101B, and a speaker 105 is disposed on the upper end portion thereof. The display section 104 is configured to display various kinds of information such as radio-wave reception, a remaining battery level, a phone number of a calling party, contents (such as a phone number and a name of the other party) registered in a telephone directory, an outgoing call register, and an incoming call register. The speaker 105 is to output voice of a calling party and the like for duration of call.

As shown in FIG. 12B, a cover glass 106 is disposed on the other side of the casing 101A, and the above-mentioned image capturing device 61 is provided at a position corresponding to the cover glass 106 inside the casing 101A. The image capturing device 61 is fixed in the casing 101A such that, for example, the lens module 1-1 described in the first embodiment is disposed on the object side (cover glass 106 side) and the solid-state imaging element 63 is disposed on the image side (the inner side of the casing 101A).

The mobile phone 100 is provided with a signal processing circuit 67 that performs various kinds of signal processing on the basis of the signal charges which are read from the solid-state imaging element 63 of the image capturing device 61. Thereby, the video signal, which is processed by the signal processing circuit 67, is stored in a storage medium such as an embedded memory, or is output to the display section 104.

The mobile phone 100 with such a configuration is provided with the image capturing device 61 having for example the lens module 1-1 described in the first embodiment of the present technology, thereby achieving a decrease in size. In particular, it is possible to achieve a decrease in thickness of the lens in the optical axis direction.

In addition, according to the embodiment of the present technology, it is possible to adopt the following configurations.

(1) A lens module includes: a lens body; a lens holding member that movably holds the lens body along an optical axis of the lens body without tilting the optical axis; a displacement element that has a flat-plate shape of which one end edge on a side of the lens body along the optical axis is disposed as a free end and the free end is displaced to freely approach the lens body by applying a voltage; and a push-up member that is disposed on the free end of the displacement element and is inserted on one end surface side of the lens body, which is perpendicular to the optical axis, by the approach towards the lens body of the displacement element so as to push up the lens body in the optical axis direction.

(2) In the lens module described in (1), the displacement element is a polymer actuator element.

(3) In the lens module described in (1) or (2), a front end of the push-up member is thinned toward a side of the lens body from the free end of the displacement element.

(4) In the lens module described in any one of (1) to (3), the lens holding member includes: a holder body that holds the lens body by a side wall along the optical axis; a fixing body that is opposed to the holder body with the lens body interposed therebetween; and a supporting body that is suspended between the holder body and the fixing body at a position, at which the lens body is interposed from a direction of the side wall, and supports the holder body so as to cause the holder body to be movable along the optical axis.

(5) In the lens module described in (4), the supporting body is formed as an elastic wire.

(6) In the lens module described in (4), the supporting body is formed as a thin flat plate in the optical axis direction of the lens body.

(7) In the lens module described in (4), the supporting body is formed of a link bar, which has rigidity, and a connecting member which rotatably connects the link bar between the fixing body and the holder body.

(8) In the lens module described in any one of (1) to (7), a center portion of the displacement element parallel with the optical axis of the lens body is formed as a fixing portion, and both end edges thereof are provided as free ends, and the push-up member is disposed on each of the free ends provided at the both ends of the displacement element, and is inserted at each of both ends of the lens body on one end surface side of the lens body by the displacement of the displacement element.

(9) In the lens module described in any one of (1) to (7), an end edge of the displacement element perpendicular to the optical axis is formed as a fixing portion, and the other end edge facing the fixing portion is provided as a free end, and the push-up member is suspended upon the free end and is provided to extend in a direction perpendicular to the optical axis of the lens body.

(10) In the lens module described in any one of (1) to (8), the lens holding member includes a mount on which the displacement element is fixed and the push-up member is placed, and a track, into which the push-up member is fit, is provided on a surface of the mount, on which the push-up member is placed, along a path of the movement of the push-up member based on the displacement of the free end of the displacement element.

(11) In the lens module described in any one of (1) to (10), a notched portion is provided on an external corner portion of the lens body or the lens holding member into which the push-up member is inserted.

(12) An image capturing device includes: a lens body; a lens holding member that movably holds the lens body along an optical axis of the lens body without tilting the optical axis; a displacement element that has a flat-plate shape of which one end edge on a side of the lens body along the optical axis is disposed as a free end and the free end is displaced to freely approach the lens body by applying a voltage; a push-up member that is disposed on the free end of the displacement element and is inserted on one end surface side of the lens body, which is perpendicular to the optical axis, by the approach towards the lens body of the displacement element so as to push up the lens body in the optical axis direction; and a solid-state imaging element that is disposed at a position at which an image is formed by the lens body.

(13) An electronic apparatus includes: a lens body; a lens holding member that movably holds the lens body along an optical axis of the lens body without tilting the optical axis; a displacement element that has a flat-plate shape of which one end edge on a side of the lens body along the optical axis is disposed as a free end and the free end is displaced to freely approach the lens body by applying a voltage; a push-up member that is disposed on the free end of the displacement element and is inserted on one end surface side of the lens body, which is perpendicular to the optical axis, by the approach towards the lens body of the displacement element so as to push up the lens body in the optical axis direction; a solid-state imaging element that is disposed at a position at which an image is formed by the lens body; and a signal processing circuit that processes an output signal from the solid-state imaging element.

The present disclosure contains subject matter related to that disclosed in Japanese Priority Patent Application JP 2011-072176 filed in the Japan Patent Office on Mar. 29, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A lens module comprising:
a lens body;
a lens holding member that movably holds the lens body along an optical axis of the lens body without tilting the optical axis;
a displacement element that has a flat-plate shape of which one end edge on a side of the lens body along the optical axis is disposed as a free end and the free end is displaced to freely approach the lens body by applying a voltage; and
a push-up member that is disposed on the free end of the displacement element and is inserted on one end surface side of the lens body, which is perpendicular to the optical axis, by the approach towards the lens body of the displacement element so as to push up the lens body in the optical axis direction, wherein a front end of the push-up member is thinned toward a side of the lens body from the free end of the displacement element.

2. The lens module according to claim 1,
wherein the displacement element is a polymer actuator element.

3. The lens module according to claim 1,
wherein a center portion of the displacement element parallel with the optical axis of the lens body is formed as a fixing portion, and both end edges thereof are provided as free ends, and
wherein the push-up member is disposed on each of the free ends provided at the both ends of the displacement element, and is inserted at each of both ends of the lens body on one end surface side of the lens body by the displacement of the displacement element.

4. The lens module according to claim 1,
wherein an end edge of the displacement element perpendicular to the optical axis is formed as a fixing portion, and the other end edge facing the fixing portion is provided as a free end, and
wherein the push-up member is suspended upon the free end and is provided to extend in a direction perpendicular to the optical axis of the lens body.

5. The lens module according to claim 1,
wherein the lens holding member includes a mount on which the displacement element is fixed and the push-up member is placed, and
wherein a track, into which the push-up member is fit, is provided on a surface of the mount, on which the push-up member is placed, along a path of the movement of the push-up member based on the displacement of the free end of the displacement element.

6. The lens module according to claim 1,
wherein a notched portion is provided on an external corner portion of the lens body or the lens holding member into which the push-up member is inserted.

7. The lens module according to claim 1, wherein the push-up member is a right triangular prism shape.

8. The lens module according to claim 7, wherein the push-up member includes a surface fixed to the free end of the displacement element, a surface that is on a mount, and a tilted surface that is tilted towards the lens body.

9. A lens module comprising:
a lens body;
a lens holding member that moveably holds the lens body along an optical axis of the lens body without tilting the optical axis;
a displacement element that has a flat-plate shape of which one end edge on a side of the lens body along the optical axis is disposed as a free end and the free end is displaced to freely approach the lens body by applying a voltage; and
a push-up member that is disposed on the free end of the displacement element and is inserted on one end surface side of the lens body, which is perpendicular to the optical axis, by the approach towards the lens body of the displacement element so as to push up the lends body in the optical axis direction,
wherein the lens holding member includes
a holder body that holds the lens body by a side wall along the optical axis,
a fixing body that is opposed to the holder body with the lens body interposed therebetween, and
a supporting body that is suspended between the holder body and the fixing body at a position, at which the lens body is interposed from a direction of the side wall, and supports the holder body so as to cause the holder body to be movable along the optical axis.

10. The lens module according to claim 9, wherein the supporting body is formed as an elastic wire.

11. The lens module according to claim 9, wherein the supporting body is formed as a thin flat plate in the optical axis direction of the lens body.

12. The lens module according to claim 9, wherein the supporting body is formed of a link bar, which has rigidity, and a connecting member which rotatably connects the link bar between the fixing body and the holder body.

13. An image capturing device comprising:
a lens body;
a lens holding member that movably holds the lens body along an optical axis of the lens body without tilting the optical axis;
a displacement element that has a flat-plate shape of which one end edge on a side of the lens body along the optical axis is disposed as a free end and the free end is displaced to freely approach the lens body by applying a voltage;
a push-up member that is disposed on the free end of the displacement element and is inserted on one end surface side of the lens body, which is perpendicular to the optical axis, by the approach towards the lens body of the displacement element so as to push up the lens body in the optical axis direction, wherein a front end of the push-up member is thinned toward a side of the lens body from the free end of the displacement element; and
a solid-state imaging element that is disposed at a position at which an image is formed by the lens body.

14. An electronic apparatus comprising:
a lens body;
a lens holding member that movably holds the lens body along an optical axis of the lens body without tilting the optical axis;
a displacement element that has a flat-plate shape of which one end edge on a side of the lens body along the optical axis is disposed as a free end and the free end is displaced to freely approach the lens body by applying a voltage;
a push-up member that is disposed on the free end of the displacement element and is inserted on one end surface side of the lens body, which is perpendicular to the optical axis, by the approach towards the lens body of the displacement element so as to push up the lens body in the optical axis direction, wherein a front end of the push-up member is thinned toward a side of the lens body from the free end of the displacement element;
a solid-state imaging element that is disposed at a position at which an image is formed by the lens body; and
a signal processing circuit that processes an output signal from the solid-state imaging element.

* * * * *